US008553596B1

(12) United States Patent
Vivanco et al.

(10) Patent No.: US 8,553,596 B1
(45) Date of Patent: Oct. 8, 2013

(54) SELECTION OF PEER-TO-PEER PROVIDERS IN A WIRELESS NETWORK

(75) Inventors: Daniel A. Vivanco, Herndon, VA (US); Esmail Hejazi Dinan, Herndon, VA (US); Vijay Rudraraju, Herndon, VA (US); Howard Bishop Anderson, Ashburn, VA (US); Hemanth Balaji Pawar, Herndon, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 786 days.

(21) Appl. No.: 12/248,735

(22) Filed: Oct. 9, 2008

(51) Int. Cl.
*H04B 7/00* (2006.01)

(52) U.S. Cl.
USPC ........... 370/310; 370/252; 709/218; 709/219; 709/224

(58) Field of Classification Search
None
See application file for complete search history.

(56) References Cited

U.S. PATENT DOCUMENTS

| | | | |
|---|---|---|---|
| 7,089,301 B1 * | 8/2006 | Labio et al. | 709/224 |
| 7,627,564 B2 * | 12/2009 | Yao et al. | 1/1 |
| 2003/0145093 A1 * | 7/2003 | Oren et al. | 709/229 |
| 2005/0086369 A1 * | 4/2005 | Mai et al. | 709/239 |
| 2005/0135295 A1 * | 6/2005 | Walton et al. | 370/328 |
| 2006/0190615 A1 * | 8/2006 | Panwar et al. | 709/231 |
| 2007/0030809 A1 * | 2/2007 | Dayama | 370/237 |
| 2007/0043863 A1 | 2/2007 | Schlesener et al. | |

* cited by examiner

*Primary Examiner* — Huy D Vu
*Assistant Examiner* — James P Duffy
(74) *Attorney, Agent, or Firm* — O'Brien Jones, PLLC

(57) ABSTRACT

A method of selecting a set of download data providers in a wireless network is disclosed. A request to download a data file from a wireless device is received. A set of potential providers that can provide one or more parts of the data file is determined. The set of potential providers is ranked based on a plurality of indicators that correspond to each of the set of potential provider. The plurality of indicators are each based on one or more wireless network operating conditions. The set of download data providers are selected based on the ranking of the set of potential providers. The data file is transferred to the wireless device by transferring one or more parts of the data file from each of the set of download data providers to the wireless device.

20 Claims, 5 Drawing Sheets

SELECTION OF PEER-TO-PEER PROVIDERS IN A WIRELESS NETWORK

TECHNICAL BACKGROUND

Wireless communication may be used as a means of accessing a network. Wireless communication has certain advantages over wired communications for accessing a network. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. To use wireless communication to access a network, a customer needs to have at least one transceiver in active communication with another transceiver that is connected to the network.

To facilitate wireless communications, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as Evolution-Data Optimized (EV-DO). The European Telecommunications Standards Institute (ETSI) has also promulgated a standard known a long term evolution (LTE). Additional standards such as the fourth generation communication system (4G) are also being pursued.

All of these standards pursue the aim of providing a comprehensive IP solution where voice, data, and streamed multimedia can be given to users on an "anytime, anywhere" basis. These standards also aim to provide higher data rates than previous generations. All of these standards may include specifications for various aspects of wireless communication with a network including processes for registering on the network, carrier modulation, frequency bands of operation, and message formats.

OVERVIEW

A method of selecting a set of download data providers in a wireless network is disclosed. A request to download a data file from a wireless device is received. A set of potential providers that can provide one or more parts of the data file is determined. The set of potential providers is ranked based on a plurality of indicators that correspond to each of the set of potential providers. The plurality of indicators are each based on one or more wireless network operating conditions. The set of download data providers are selected based on the ranking of the set of potential providers. The data file is transferred to the wireless device by transferring one or more parts of the data file from each of the set of download data providers to the wireless device.

A method of transferring a data file to a wireless device by transferring one or more portions of a data file from each of a set of download data providers is disclosed. The data file is stored on a first wireless device linked to a wireless network. The data file is stored on a second wireless device linked to the wireless network. The data file is stored on a third wireless device linked to the wireless network. A first ranking number is associated with the first wireless device. A second ranking number is associated with the second wireless device. A third ranking number is associated with the third wireless device. The first ranking number, the second ranking number, and the third ranking number are based on indicators of wireless network operating conditions associated with the first wireless device, the second wireless device, and the third wireless device, respectively. The first wireless device and the second wireless device are selected to be members of the set of download data providers based on the first ranking number and the second ranking number.

A method of operating a communication system is disclosed. A data file is stored on one or more wireless devices. The data file is stored on one or more wired devices. A request to download the data file is received from a requesting wireless device. Based on an indication of at least one network operating condition, a first upload device is selected from the one or more wireless devices to provide at least a first portion of the data file. The first portion of the data file is supplied to requesting wireless device using the first upload device to provide the first portion of the data file.

DETAILED DESCRIPTION

In an embodiment, a wireless device may request data stored on a content server. All or parts of this data may also be stored on other wireless devices, or other devices that are part of the wireless network. A peer-to-peer protocol may be utilized to provide the wireless device with the data. The peer-to-peer protocol may allow the data to be provided to the wireless device by multiple devices individually providing multiple sub-parts of the data.

To determine which devices are going to provide the multiple sub-parts to the requesting device, potential sending devices may be ranked based on indicators of wireless network operating conditions. Potential sending devices are those devices that have a copy of all or part of the requested data. Examples of wireless network operating conditions that may be factors in the ranking are: (1) the modulation and coding scheme associated with a potential sending device; (2) the location of the potential sending device; (3) the backhaul or network resource utilization between the requesting device and the potential sending device; (4) the air-interface utilization associated with the base station servicing the potential sending device; and, (5) the minimum available bandwidth between the potential sending device and the requesting device. This ranking may be used to select which of the potential sending devices are going to provide one or more of the multiple sub-parts of the requested data.

Figure 1:
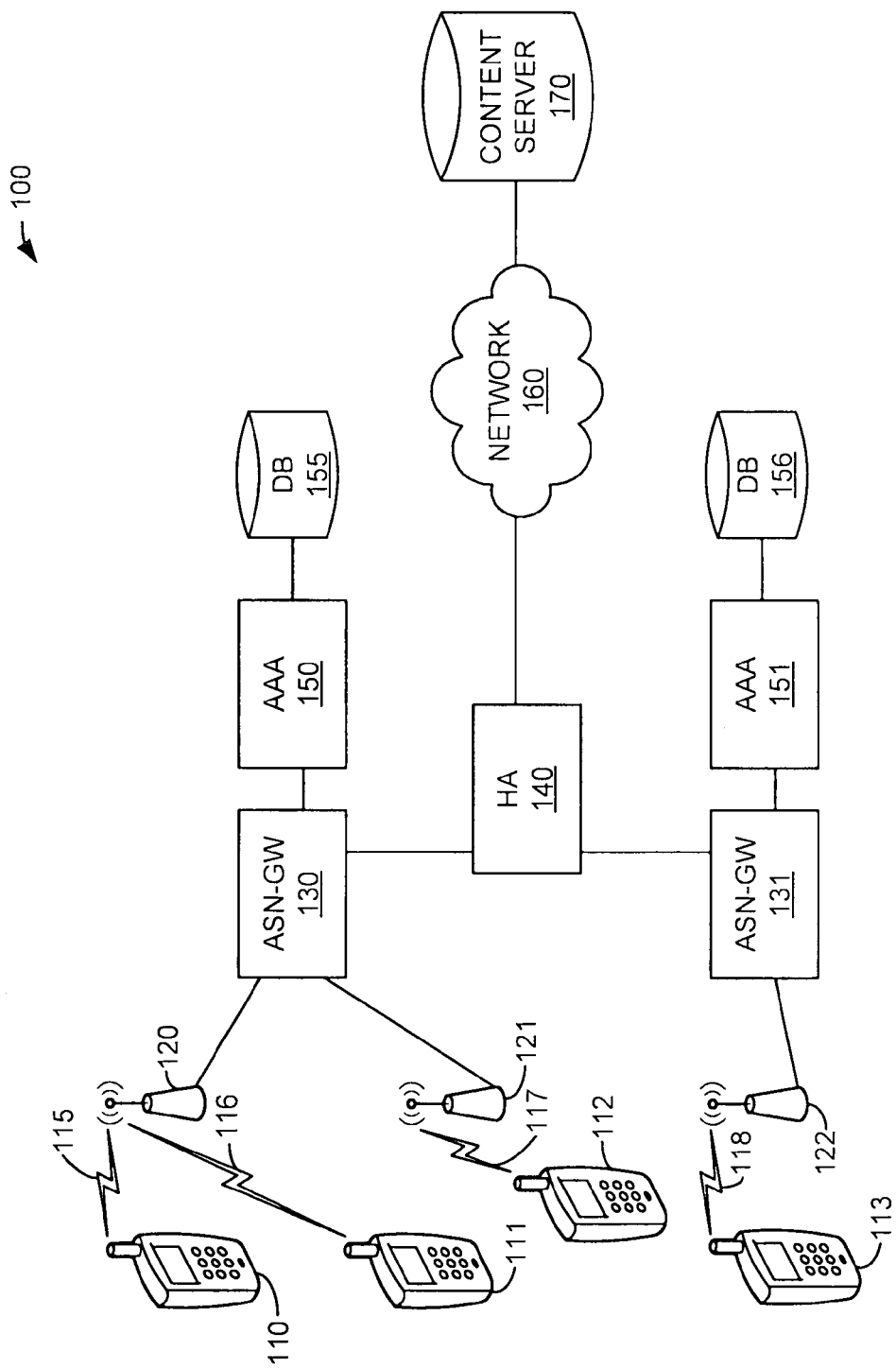
FIG. 1 is a block diagram illustrating a communication system.

FIG. 1 is a block diagram illustrating a communication system. In FIG. 1 communication system 100 comprises: wireless device 110; wireless device 111; wireless device 112; wireless device 113; base station 120; base station 121; base station 122; access services network gateway (ASN-GW) 130; ASN-GW 131; home agent (HA) 140; authentication, authorization, and accounting server (AAA) 150; AAA 151; database (DB) 155; DB 156; network 160; and content server 170.

Wireless device 110 is operatively coupled to base station 120 via wireless link 115. Wireless device 111 is operatively coupled to base station 120 via wireless link 116. Wireless device 112 is operatively coupled to base station 121 via wireless link 117. Wireless device 113 is operatively coupled to base station 122 via wireless link 118.

Base station 120 is operatively coupled to ASN-GW 130. Base station 121 is operatively coupled to ASN-GW 130. Base station 122 is operatively coupled to ASN-GW 131. ASN-GW 130 is operatively coupled to HA 140. ASN-GW 130 is operatively coupled to AAA 150. AAA 150 is operatively coupled to DB 155. ASN-GW 131 is operatively coupled to HA 140. ASN-GW 131 is operatively coupled to AAA 151. AAA 151 is operatively coupled to DB 156. HA 140 is operatively coupled network 160. Content server 170 is operatively coupled to network 160. Thus, each element of communication system 100 may communicate data with every other element of communication system 100. In particular, data, files, or portions of files stored on content server 170 may be communicated to, and stored on, wireless devices 110-113 or DBs 155-156.

In an example, communication system 100 may be, or include all or parts of an IEEE 802.16 (WiMAX) specified system. These parts may include an access services network (ASN), or connectivity service network (CSN). These parts may include base stations 120-122, ASN-GWs 130-131, AAAs 150-151, DBs 155-156, and HA 140. In another example, network 160 and content server 170 may also be parts of a WiMAX specified system.

Wireless devices 110-113 may be any device, system, combination of devices, or other such communication platform capable of communicating wirelessly with base stations 120-122. Each of wireless devices 110-113 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via base stations 120-122. Other types of communication platforms are possible.

Wireless devices 110-113 may establish a communication sessions with base stations 120-122 in order to receive data or files stored by content server 170. In addition, wireless devices 110-113 may receive communication service via at least one of base stations 120-122. This communication service may include voice service and data service. This communication service may include a plurality of services. These services may include but are not limited to telephone service, long distance service, mobile voice service, mobile data service, push-to-talk service, internet service, web browsing, email, pictures, picture messaging, video, video messaging, audio, voicemail, music, MP3's, ring tones, stock tickers, news alerts, and so on.

Network 160 could be any network or collection of networks that couple, link, or otherwise operatively connect HA 140 with other computer systems, networks, or content server 170. In addition, other secondary data networks could be used. In an example, communication network 160 may include a backhaul network, a local network, a long distance network, a packet network, the internet, or any combination thereof, as well as other types of networks.

Base stations 120-122 may be any wireless system that provides the air interface to wireless devices 110-113, and communication connectivity to network 160 via ASN-GW 130 or 131 and HA 140. Examples of base stations 120-122 that may be utilized include, base transceiver stations (BTSs), radio base stations (RBSs), Node B, enhanced Node B (eNBs) and others. Base stations 120-122 may include a number of elements known to those skilled in the art comprising a transceiver, power amplifier, combiner, duplexer, antenna and control function. ASN-GWs 130-131 may be, be part of, or include an access service network (ASN), wireless local access network access gateway (WAG), packet data gateway (PDG), mobile switching center (MSC) and packet data serving node (PDSN).

In an embodiment, a wireless device 110 may request to download a data file stored on content server 170. This data file may be transferred to wireless device 110 in multiple parts and from multiple sources that are not necessarily content server 170. For example, one or more portions of the requested data file may be transferred to wireless device 110 from one or more of wireless devices 111-113. These transfers may utilize a peer-to-peer file sharing protocol. For example, these transfers may utilize the BitTorrent protocol. Wireless devices 111-113 that are storing one or more portions of the requested file are referred to as seeds. A seed is a peer that has a copy of one or more portions of the requested file and is offering to provide at least a portion of what it has.

In an example, wireless device 110 may send a request to AAA 150 asking to download a data file that is stored on content server 170. This data file, or portions thereof, may also be stored on wireless devices 111-113.

Communication system 100 may determine a set of potential providers (seeds). This set of seeds comprises those elements of communication system 100, including wireless device 111-113, that can provide one or more parts of the requested data file. For example, AAA 150 may determine that wireless devices 111-113 are seeds because each of these wireless or wired devices is storing one or more portions of the requested data file. AAA 150 may determine that wireless devices 111 and 112 are storing one or more portions of the requested data file by checking its own DB 155. AAA 150 may determine that wireless device 113 is storing one or more portions of the requested data file by asking AAA 151. AAA 151 may then query its DB 156 to determine whether wireless device 113 is storing one or more portions of the requested data file.

Communication system 100 may rank the set of seeds based on one or more indicators of wireless network operating conditions. For example, AAA 150 may create a matrix, or list, of seeds. This list of seeds may be organized by the indicators of wireless network operating conditions. Examples of wireless network operating conditions are: (1) the modulation and coding scheme associated with a seed; (2) the location of the seed (i.e., the number of hops or other devices between the requesting device and the seed, or some other indicator of distance); (3) the backhaul or network resource utilization between the requesting device and the seed; (4) the air-interface utilization associated with the base station servicing the seed; and, (5) the minimum available bandwidth between the seed and the requesting device. The minimum available bandwidth (throughput) may be determined by taking the minimum of: (1) the air-interface bandwidth between the seed and its base station; (2) the backhaul bandwidth; and (3) network core available bandwidth.

To rank the set of seeds based on the one or more wireless network operating conditions, an indicator of each operating condition may be transformed into a normalized number between zero (0.0) and one (1.0). Each indicator of an operating condition is transformed according to its relevance in choosing which seeds are to be selected to provide one or more parts of the requested data file. A higher number may represent a more relevant seed. A set of thresholds may be defined for each indicator of an operating condition. If a seed does not satisfy one or more of these thresholds, that seed may be eliminated from consideration.

A ranking number may be generated for each seed. This ranking number may be a weighted sum of each of the normalized indicators of operating conditions. Specifically, a given seed (k) may be given a ranking number according to following formula:

$$r_k = \frac{\sum_{j=1}^{N} w_j i_j}{\sum_{j=1}^{N} w_j}$$

where N is the number of indicators of operating conditions being considered. The number of indicators of operating conditions being considered (i.e., N), the specific indicators of operating conditions being considered, and the weighting factors ($w_j$) may be determined by an operator of communication system 100.

The ranking number may then be used by communication system 100 to determine which seeds are selected to provide the requested data file. For example, AAA 150 may select the top S seeds to provide the requested data file, where S is an arbitrary number greater than 1 selected by the operator of communication system 100. Communication system 100 may then instruct the selected seeds to transfer the requested data file to the requester. As discussed previously, a peer-to-peer file sharing protocol, such a BitTorrent, may used to control or facilitate the transfers.

If communication system 100 detects a significant change in one or more of the indicators of operating conditions associated with any of the potential seeds, the communication system may repeat the selection process with the new indicators of operating conditions. In addition, communication system 100 may utilize this ranking process to consider potential seeds that are wired to the network rather than wireless devices 111-113. In this manner, communication system 100 may select a mix of wired and wireless devices to act as seeds.

Figure 2:
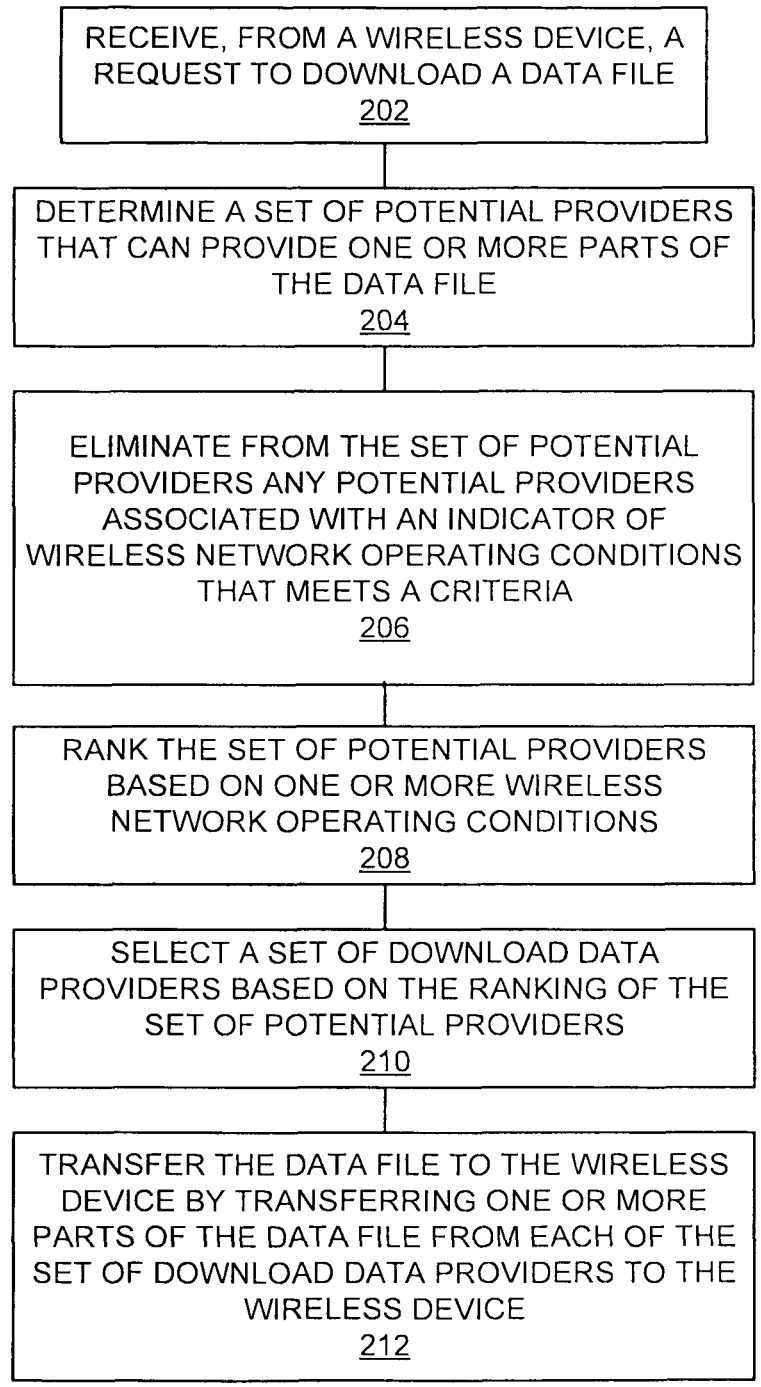
FIG. 2 is a flowchart illustrating a method of selecting data providers.

FIG. 2 is a flowchart illustrating a method of selecting data providers. The steps illustrated in FIG. 2 may be performed by one or more elements of communication system 100.

A request to download a data file is received from a wireless device (202). For example, AAA 150 may receive, from wireless device 110, a request to download data from content server 170. A set of potential providers that can provide one or more parts of the data file is determined (204). For example, AAA 150 may query DB 155 to determine which elements of communication system 100, in addition to content server 170, may possess one or more parts of the requested data. In addition, AAA 150 may ask AAA 151 (which would in turn query DB 156) which elements of communication system 100 may possess one or more parts of the requested data.

Any potential providers (seeds) that are associated with an indicator of wireless network operating conditions that meets a criteria are eliminated from the set of potential providers (206). For example, AAA 150 may eliminate wireless device 113 from the set of seeds because the modulation and coding scheme associated with wireless device 113 indicates that wireless device 113 would provide data at a very slow rate. In another example, AAA 150 may eliminate wireless device 113 from the set of seeds because it is too many hops from the requesting wireless device 110. This large number of hops may cause congestion in communication system 100.

The set of potential providers is ranked based on one or more wireless network operating conditions (208). For example, AAA 150 may rank seeds by generating a ranking number and then ordering the seeds according to their ranking number. The process for generating a ranking number may generally follow the steps and formula described in the discussion of FIG. 1 for generating a ranking number.

A set of download data providers are selected based on the ranking of the set of potential providers (210). For example, AAA 150 may select wireless device 111 and wireless device 112 based on their ranking from block 208. AAA 150 may select wireless device 111 and wireless 112 because they were the top two highest ranked. AAA 150 may also select other devices. For example, AAA 150 may select a wired device based on the ranking determined in block 208. In an example, AAA 150 may select content server 170, or DB 156 to as download data providers.

The data file is transferred to the wireless device by transferring one or more parts of the data file from each of the set of download data providers to the wireless device (212). For example, wireless device 111 and wireless device 112 may each transfer a portion of the data file to wireless device 110. Wireless device 110 may then assemble these portions to create a copy of the data file. In another example, wireless device 111, wireless device 112, and content server 170 may each transfer a portion of the data file to wireless device 110. These transfers may utilize a peer-to-peer protocol such as BitTorrent. Alternately, or in addition to BitTorrent, other peer-to-peer protocols may be used.

Figure 3:
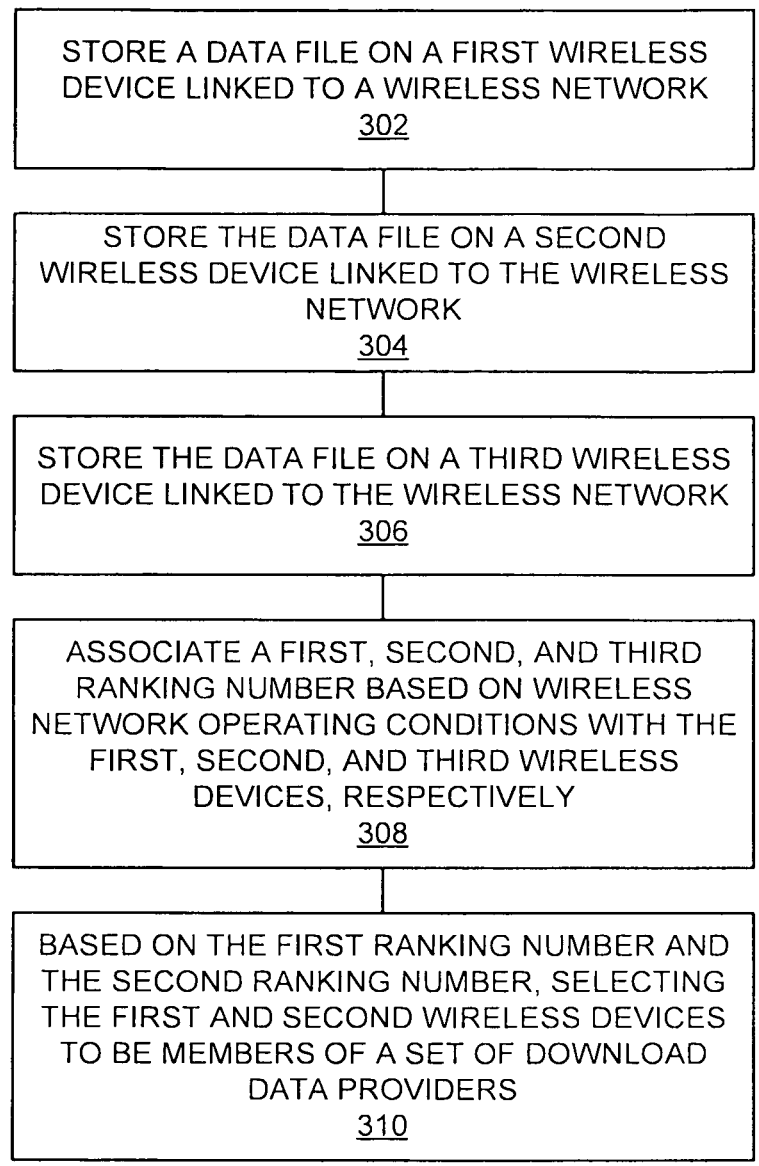
FIG. 3 is a flowchart illustrating a method of transferring a data file.

FIG. 3 is a flowchart illustrating a method of transferring a data file. The steps illustrated in FIG. 3 may be performed by one or more elements of communication system 100.

A data file is stored on a first wireless device that is linked to a wireless network (302). For example, a data file, or portion thereof, that is also stored on content server 170 may be stored on wireless device 111. Wireless device 111 is linked to the other elements of communication system 100 by wireless link 116. The data file is stored on a second wireless device that is linked to the wireless network (304). For example, the data file that is stored on wireless device 111, or some portion thereof, may also be stored on wireless device 112. Wireless device 112 is linked to the other elements of communication system 100 by wireless link 117. The data file is stored on a third wireless device that is linked to the wireless network (306). For example, the data file that is stored on wireless device 111 and wireless device 112, or some portion thereof, may also be stored on wireless device 113. Wireless device 113 is linked to the other elements of communication system 100 by wireless link 118.

A first, second, and third ranking number is associated with the first, second, and third wireless devices, respectively (308). These ranking numbers are based on wireless network operating conditions. For example, a first ranking number may be associated with wireless device 111 based on wireless network operating conditions. This ranking number may be a weighted sum of a set of indicators of operating conditions. Specifically, wireless device 111 may be associated with a ranking number according to following formula: $r_{111} = w_1 i_1 + w_2 i_2 + \ldots + w_N i_N$ where the $w_k$ factors are weighting factors and the $i_k$ factors are indicators of wireless network operating conditions associated with wireless device 111 and/or the link between wireless device 111 and a destination device. Wireless device 112 and wireless device 113 may be associated with ranking numbers in a similar manner. In addition, wired devices, such as content server 170 or DB 156 may be associated with ranking numbers in a similar manner.

Examples of wireless network operating conditions are: (1) the modulation and coding scheme associated with a seed; (2) the location of the seed (i.e., the number of hops or other devices between the requesting device and the seed, or some other indication of distance); (3) the backhaul or network resource utilization between the requesting device and the seed; (4) the air-interface utilization associated with the base station servicing the seed; and, (5) the minimum available bandwidth between the seed and the requesting device. The minimum available bandwidth (throughput) may be determined by taking the minimum of: (1) the air-interface bandwidth between the seed and its base station; (2) the backhaul bandwidth; and (3) network core available bandwidth.

In addition, a device may be eliminated from consideration based on one or more indicators of wireless network operating conditions. For example, wireless device 113 may be eliminated from consideration because the modulation and coding scheme associated with wireless device 113 indicates that wireless device 113 would provide data at a very slow rate. In another example, wireless device 113 may be eliminated from consideration because it is too many hops from wireless device 113 to the ultimate destination of the data file. This large number of hops may cause congestion in communication system 100.

Based on the first ranking number and the second ranking number, the first and second wireless devices are selected to be members of a set of download data providers (310). For example, wireless device 111 and wireless device 112 may be selected to provide one or more portions of the data file to wireless device 110 based on the ranking numbers associated with wireless device 111 and wireless device 112. In another example, wireless device 111 and wireless device 112 may be selected to provide one or more portions of the data file to wireless device 110 based on the high ranking numbers associated with wireless device 111 and wireless device 112 and a low ranking number associated with wireless device 113. The one or more portions provided by wireless device 111 and wireless device 112 may be transferred to wireless device 110 using a peer-to-peer protocol.

Figure 4:
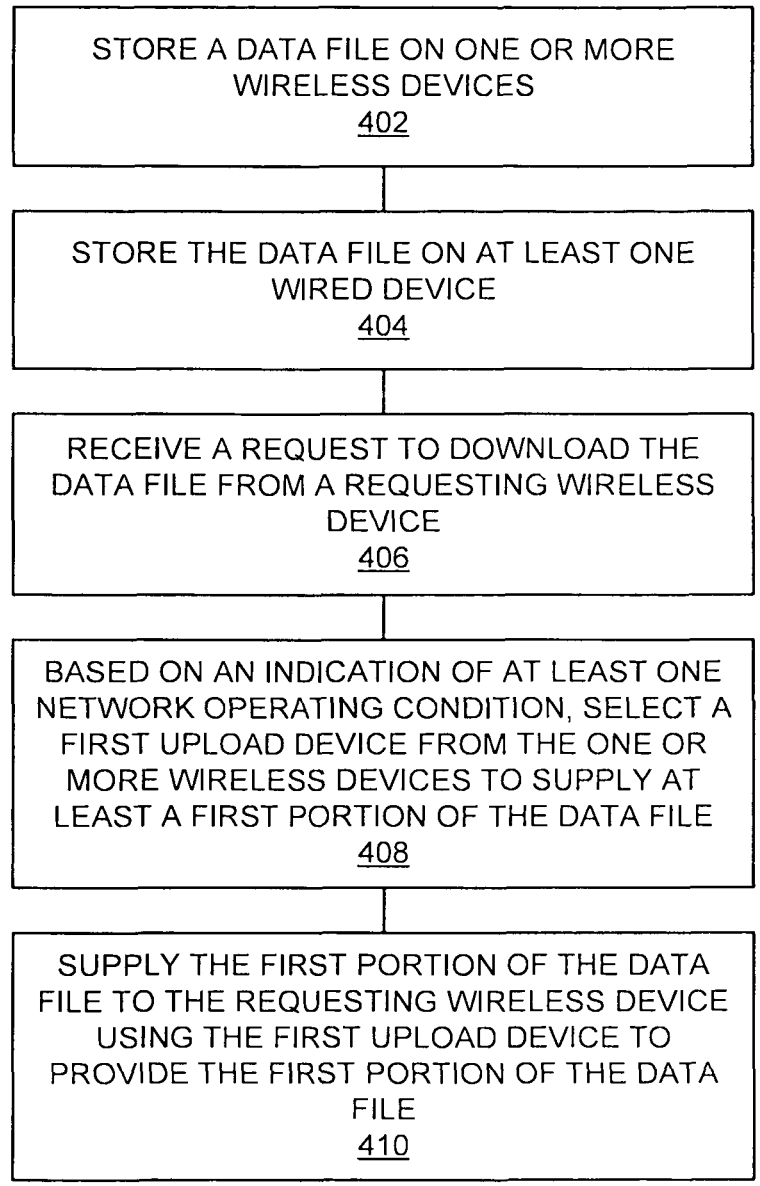
FIG. 4 is a method of operating a communication system.

FIG. 4 is a method of operating a communication system. The steps illustrated in FIG. 4 may be performed by one or more elements of communication system 100.

A data file, or portion thereof, is stored on one or more wireless devices (402). For example, copies of a data file, or portions thereof, from content server 170 may be stored on wireless devices 111-113. The data file, or a portion thereof, is stored on at least one wired device (404). For example, the data file from content server 170, or a portion thereof, may also be stored by DB 156.

A request to download the data file is received from a requesting wireless device (406). For example, AAA 150 may receive a request from wireless device 110 to download the data file that is stored on wireless devices 111-113. Base on an indication of at least one network operating condition, a first upload device is selected from the one or more wireless devices to supply at least a first portion of the data file (408). For example, based on an indication of at least one network operating condition of communication system 100, AAA 150 may select wireless device 111 as a seed to supply at least a first portion of the requested data file. Examples of network operating conditions and indicators of network operating conditions have been discussed previously.

The first portion of the data file is supplied to the requesting device using the first upload device to provide the first portion of the data file (410). For example, wireless device 110 may be supplied by wireless device 111 with a first portion of the requested data file. Wireless device 110 and wireless device 111 may utilize a peer-to-peer protocol to facilitate the transfer of the first portion of the data file.

The methods, systems, devices, networks, base stations, gateways, servers, and databases described above may be implemented with, contain, or be executed by one or more computer systems. The methods described above may also be stored on a computer readable medium. Many of the elements of communication network 100 may be, comprise, or include computers systems. This includes, but is not limited to: communication system 100; wireless device 110; wireless device 111; wireless device 112; wireless device 113; base station 120; base station 121; base station 122; ASN-GW 130; ASN-GW 131; HA 140; AAA 150; AAA 151; DB 155; DB 156; network 160; and content server 170.

Figure 5:
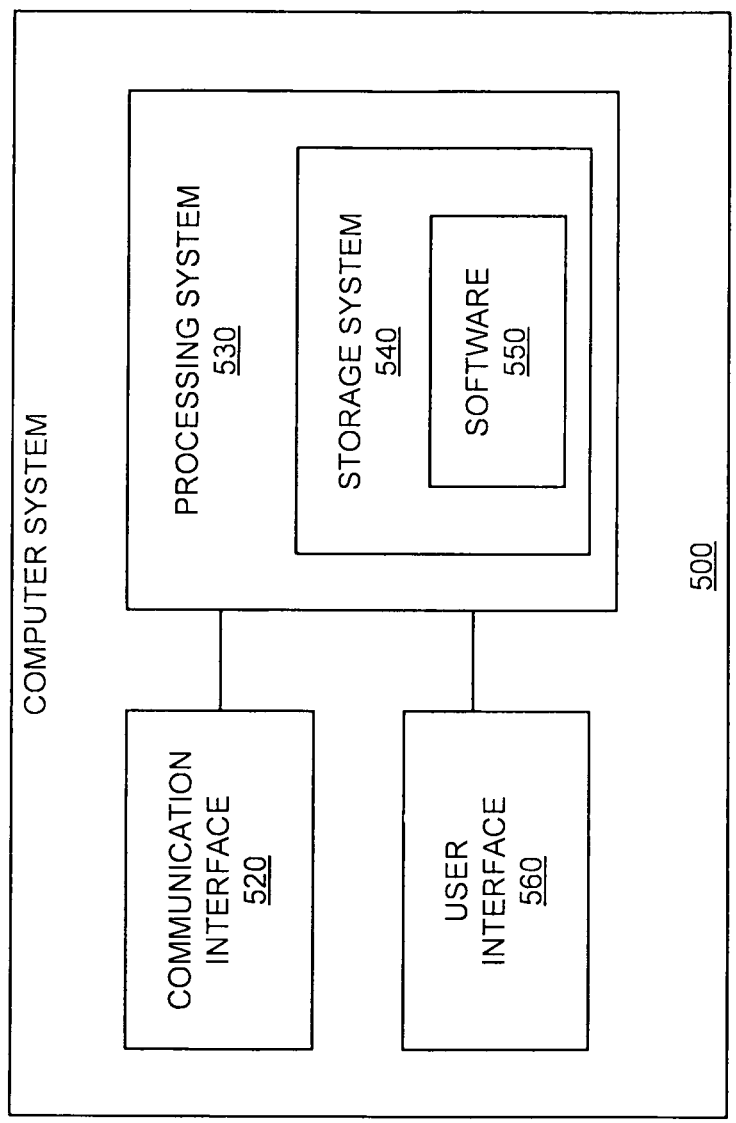
FIG. 5 is a block diagram of a computer system.

FIG. 5 illustrates a block diagram of a computer system. Computer system 500 includes communication interface 520, processing system 530, and user interface 560. Processing system 530 includes storage system 540. Storage system 540 stores software 550. Processing system 530 is linked to communication interface 520 and user interface 560. Computer system 500 could be comprised of a programmed general-purpose computer, although those skilled in the art will appreciate that programmable or special purpose circuitry and equipment may be used. Computer system 500 may be distributed among multiple devices that together comprise elements 520-560.

Communication interface 520 could comprise a network interface, modem, port, transceiver, or some other communication device. Communication interface 520 may be distributed among multiple communication devices. Processing system 530 could comprise a computer microprocessor, logic circuit, or some other processing device. Processing system 530 may be distributed among multiple processing devices. User interface 560 could comprise a keyboard, mouse, voice recognition interface, microphone and speakers, graphical display, touch screen, or some other type of user device. User interface 560 may be distributed among multiple user devices. Storage system 540 could comprise a disk, tape, integrated circuit, server, or some other memory device. Storage system 540 may be distributed among multiple memory devices.

Processing system 530 retrieves and executes software 550 from storage system 540. Software 550 may comprise an operating system, utilities, drivers, networking software, and other software typically loaded onto a computer system. Software 550 could comprise an application program, firmware, or some other form of machine-readable processing instructions. When executed by processing system 530, software 550 directs processing system 530 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of selecting a set of download data providers in a wireless network, comprising:

receiving a request to download a data file from a wireless device at a network node, the wireless device communicating with a wireless device interface of an access node, the network node communicating with a network interface of the access node;

determining, at the network node, a set of potential providers that can provide one or more parts of the data file;

determining, at the network node, a plurality of indicators that correspond to each of the set of potential providers, the plurality of indicators each based on one or more wireless network operating conditions of each of the set of potential providers, wherein the plurality of indicators comprises an indicator of a modulation and coding scheme associated with at least one of the set of potential providers;

ranking the set of potential providers at the network node based on the plurality of indicators that correspond to each of the set of potential providers;

selecting the set of download data providers at the network node based on the ranking of the set of potential providers; and, transferring the data file to the wireless device by transferring one or more parts of the data file from each of the set of download data providers to the wireless device.

2. The method of claim 1, wherein the plurality of indicators further comprises an indicator of distance from each of the set of potential providers to the wireless device.

3. The method of claim 1, wherein the plurality of indicators further comprises an indicator of throughput for one or more elements of the wireless network.

4. The method of claim 3, wherein the indicator of throughput for one or more elements of the wireless network is based on a throughput of a backhaul link.

5. The method of claim 3, wherein the indicator of throughput for one or more elements of the wireless network is based on a throughput of a core network link.

6. The method of claim 3, wherein the indicator of throughput for one or more elements of the wireless network comprises a modulation and coding scheme associated with at least one of the set of potential providers.

7. The method of claim 1, further comprising the step of:
eliminating, at the network node, from the set of potential providers at least one potential provider associated with an indicator of wireless network operating conditions that meets a criteria.

8. The method of claim 1, wherein the set of potential providers comprises wired devices and wireless devices.

9. The method of claim 1, wherein ranking the set of potential providers at the network based on the plurality of indicators that correspond to each of the set of potential providers comprises:
comparing each of the plurality of indicators to a threshold;
eliminating each potential provider associated with the plurality of indicators that do not satisfy the threshold from ranking consideration; and
ranking the potential providers based on the plurality of indicators that satisfy the threshold.

10. The method of claim 1, wherein ranking the set of potential providers at the network based on the plurality of indicators that correspond to each of the set of potential providers comprises:
normalizing each of the plurality of indicators;
performing a weighted sum of each of the normalized indicators; and
ranking the set of potential providers based on the weighted sum of the normalized indicators.

11. A method of transferring a data file to a wireless device by transferring one or more portions of a data file from each of a set of download data providers, comprising:
storing the data file on a first wireless device linked to a wireless network;
storing the data file on a second wireless device linked to the wireless network;
storing the data file on a third wireless device linked to the wireless network;
determining, at a network node, indicators of wireless network operating conditions associated with the first wireless device, the second wireless device, and the third wireless device, respectively, the first, second and third wireless devices each communicating with a wireless device interface of an access node, the network node communicating with a network interface of the access node, wherein the indicators comprise an indicator of a modulation and coding scheme associated with the first wireless device, the second wireless device, and the third wireless device;

associating, at the network node, a first ranking number with the first wireless device, a second ranking number with the second wireless device, and a third ranking number with the third wireless device, the first ranking number, the second ranking number, and the third ranking number are based on the indicators of the wireless network operating conditions associated with the first wireless device, the second wireless device, and the third wireless device, respectively; and, selecting, at the network node, the first wireless device and the second wireless device to be members of the set of download data providers based on the first ranking number and the second ranking number.

12. The method of claim 11, wherein the first wireless device and the second wireless device are selected to be members of the set of download data provider based on the third ranking number.

13. The method of claim 11, wherein the third wireless device is not selected to be a member of the set of download data providers based on at least one indicator of wireless network operating conditions associated with the third wireless device meeting a criteria.

14. The method of claim 11, wherein the indicators of wireless network operating conditions further comprise indicators of distance from the wireless device to the first wireless device, the second wireless device, and the third wireless device.

15. The method of claim 11, wherein the indicators of wireless network operating conditions further comprise indicators of throughput for one or more elements of the wireless network.

16. A method of operating a communication system, comprising:
storing a data file on one or more wireless devices;
storing the data file on one or more wired devices;
receiving a request to download the data file from a requesting wireless device at a network node, the requesting wireless device communicating with a wireless device interface of an access node, the network node communicating with a network interface of the access node;
determining, at the network node, an indication of at least one network operating condition for at least one of the one or more wireless devices, wherein the indication of at least one network operating condition comprises a modulation and coding scheme associated with at least one of the one or more wireless devices;
based on the indication of the at least one network operating condition, selecting, at the network node, a first upload device from the one or more wireless devices to provide at least a first portion of the data file; and,
supplying the first portion of the data file to the requesting wireless device using the first upload device to provide the first portion of the data file.

17. The method of claim 16, wherein the modulation and coding scheme indication is associated with the first upload device.

18. The method of claim 16, further comprising:
selecting a second upload device from the one or more wired devices to provide at least a second portion of the data file based on a second indication of at least one network operating condition.

19. The method of claim 16, wherein the second indication of at least one network operating condition is associated with a throughput of one or more elements of a wireless network.

20. The method of claim 19, wherein the throughput of the one or more elements of a wireless network is based on an indicator of a modulation and coding scheme associated with the first upload device.

* * * * *